United States Patent [19]

Ealer

[11] Patent Number: 4,594,213

[45] Date of Patent: Jun. 10, 1986

[54] REDUCTION ELIMINATION OF BUBBLE FORMATION WHEN EXTRUDING GRANULAR POLYOLEFINS

[75] Inventor: George E. Ealer, Whitehouse Station, N.J.

[73] Assignee: Union Carbide Corporation, Danbury, Conn.

[21] Appl. No.: 654,217

[22] Filed: Sep. 25, 1984

[51] Int. Cl.$^4$ .............................................. D01F 1/02
[52] U.S. Cl. ........................... 264/211; 264/210.6; 264/564; 524/229; 524/232
[58] Field of Search ............... 524/232, 229; 264/211, 264/210.6, 564

[56] References Cited

U.S. PATENT DOCUMENTS

| | | | |
|---|---|---|---|
| 2,991,264 | 7/1961 | Monroe, Jr. et al. | 524/232 |
| 4,322,503 | 3/1982 | Chatterjee | 524/232 |
| 4,430,289 | 2/1984 | McKinney et al. | 524/232 |

FOREIGN PATENT DOCUMENTS

| | | | |
|---|---|---|---|
| 224302 | 5/1958 | Australia | 524/229 |
| 422814 | 2/1967 | Japan | 524/232 |
| 57-3840 | 1/1982 | Japan | 524/229 |
| 7513808 | 5/1976 | Netherlands | 524/232 |

OTHER PUBLICATIONS

Hackh's Chemical Dictionary, p. 306.

*Primary Examiner*—Joseph L. Schofer
*Assistant Examiner*—N. Sarofim
*Attorney, Agent, or Firm*—Clement J. Vicari

[57] ABSTRACT

A method for reducing the incidence of lensing in films formed from a granular linear low density ethylene hydrocarbon copolymer resin by substituting silica alumina ceramic microspheres for all or part of the inorganic antiblock agent normally used in said compositions.

15 Claims, No Drawings

REDUCTION ELIMINATION OF BUBBLE FORMATION WHEN EXTRUDING GRANULAR POLYOLEFINS

FIELD OF THE INVENTION

The present invention relates to a method for reducing the incidence of lensing in films formed from granular polyolefins such as polyethylene.

BACKGROUND OF THE INVENTION

Free radical initiated low density polyethylene has, historically, been polymerized in heavy walled autoclaves or tubular reactors at pressures as high as 50,000 psi and temperatures up to 300° C. The molecular structure of high pressure free radical initiated, low density polyethylene is highly complex. The permutations in the arrangement of their simple building blocks are essentially infinite. Free radical initiated LDPE's are characterized by an intricate long chain branched molecular architecture. These long chain branches have a dramatic effect on the melt rheology of these resins. Free radical initiated LDPE's also possess a spectrum of short chain branches, generally 1 to 6 carbon atoms in length. These short chain branches disrupt crystal formation and depress resin density.

With recent developments in transition metal catalyst chemistry, low density polyethylene can now be produced by copolymerizing ethylene with various alpha-olefins. These linear low density polyethylene (LLDPE) resins generally possess little, if any, long chain branching. They are short chain branched with branch length and frequency controlled by the type and amount of comonomer used during polymerization.

U.S. Pat. No. 4,302,566, in the names of F. J. Karol et al. and entitled Preparation of Ethylene Copolymers in Fluid Bed Reactor, discloses that ethylene copolymers, having a density of 0.91 to 0.96, a melt flow ratio in the range; of from greater than or equal to 22, to less than or equal to 32, and a relatively low residual catalyst content, can be produced in granular form at relatively high productivities, if the monomer(s) are copolymerized in a gas phase process with a specific high activity Mg-Ti containing complex catalyst which is blended with an inert carrier material.

U.S. Pat. No. 4,302,565, in the names of G. L. Goeke et al. and entitled Impregnated Polymerization Catalyst, Process For Preparing, and Use for Ethylene Copolymerization discloses that ethylene copolymers, having a density of 0.91 to 0.96, a melt flow rate in the range of from greater than or equal to 22, to less than or equal to 32, and a relatively low residual catalyst content can be produced in granular form at relatively high productivities, if the monomer(s) are copolymerized in a gas phase process with a specific high-activity Mg-Ti containing complex catalyst which is impregnated in a porous inert carrier material.

According to another technique, ethylene homopolymers having a density in the range of from about greater than or equal to 0.958 to less than or equal to 0.972, and a melt flow ratio in the range of from about greater than or equal to 22, to about less than or equal to 32, which have a relatively low residual catalyst residue, can be produced at relatively high productivities for commercial purposes by a low pressure gas phase process, if the ethylene is homopolymerized in the presence of a high-activity Mg-Ti containing complex catalyst which is blended with an inert carrier material. The granular polymers thus produced are useful for a variety of end use applications.

The polymers as produced, for example, by the process of said patents and technique using the Mg-Ti containing complex catalyst possess a narrow molecular weight distribution, Mw/Mn, in the range of from about greater than or equal to 2.7, to less than or equal to 4.1.

Over the years, film extrusion equipment has been optimized for the rheology of free radical initiated LDPE. The different molecular architecture of LLDPE results in a film processing behavior which requires different extrusion parameters. Although LLDPE resins can be extruded on equipment designed for free radical initiated LDPE resins, certain equipment modifications are often required in order to extrude the LLDPE resins at optimum conditions and at rates comparable to the high pressure resins. This is particularly true during extrusion of LLDPE which is processed into film.

Processing of granular polyolefins in single screw extruders involves feeding, conveying, melting, compressing, pumping, and homogenizing the material as it passes from one end of the extruder to the other. Bubble formation in the extrudate can arise when a critical level of volatiles/gases become trapped during the melting stage of extrusion and are not allowed to vent to atmosphere back through the extruder hopper. These volatiles/gases can originate in the resin and/or concentrate/or in the additives which are blended with the resin. They can also be generated during the extrusion process, evolving for example from thermally induced breakdown of concentrate/additive/resin components. The problems incident to the production of bubble free product from "powdered" polyolefins are discussed in U.S. Pat. No. 4,248,819 issued Feb. 3, 1981. According to the disclosure of the patent, the polyolefin powder is heated to a temperature of between 40° C. and its melting point, and is introduced into a gap between two gap-forming elements. In this gap, the powder is compressed with a pressure of from 0.1 to 10 t per cm of gap length, and the powder so compressed is then comminuted.

It is noted that according to the patentee, the problems are incident to the use of "powdery" materials as contrasted to the use of "granular" materials.

According to the present invention, however, the term granular resin generally refers to the same type resin as defined by the term "powdery" in the U.S. Pat. No. 4,248,819.

In film extrusion, and particularly, film extrusion of LLDPE resins, bubbles formed as described above become elongated during melt extension between the die and the point where the extrudate undergoes a phase transformation to the solid state (frost line). The distorted bubbles are "frozen" in the fabricated film, taking on the shape of lenses (in crossection). These lens defects are relatively clear elongated blisters within the film. Under a microscope, one normally observes an elongated bubble with two distinct surfaces although in some cases, one of the surfaces may be ruptured by gases escaping from the bubble. The number, the density, and the size distribution of lenses are, in general, entirely random across the body of the film. Lens dimensions may vary from a few hundredths inch to over one inch in length, depending on the severity of the prevailing lensing conditions. At high concentrations, lenses can weaken the film and affect end use performance. At low concentrations, lenses affect primarily aesthetics.

Extrudate bubble formation (leading to lenses in fabricated film) during the extrusion of granular polyolefins is a complex multivariate process. Numerous factors are involved in lens formation. Both fabrication parameters and material parameters have been found to be important. Factor interactions further complicate the phenomenon.

Granular polyolefins, and particularly, granular LLDPE, generally exhibit a different melting behavior in extrusion than polyolefin pellets. The melting mechanism of pellets is governed by a thin layer of melt between the solid bed and the barrel, where shear generates heat to melt the top of the solid bed. When processing pellets, volatiles/gases can escape over the trailing edge of the screw and vent out the extruder hopper. In the case of granular polyolefins however, melting is generally more rapid. Volatiles/gases are trapped when the granular solid bed becomes encapsulated by the surrounding melt pool.

Granular polyolefins can have substantial porosity and high surface area relative to resin pellets. Increased air entrainment during extrusion is therefore a possibility.

A rheological consequence of the narrow molecular weight distribution characterizing these linear low density ethylene hydrocarbon copolymers, is that in the shear rate range common to most single screw extruders (100-5000 sec$^{-1}$), these materials exhibit limited shear thinning behavior. The practial melt viscosity obtained in the extruder in processing these materials, is high relative to that obtained with long chain branched, free radical initiated, high pressure, low density polyethylene (at equivalent melt index).

The high shear viscosity of narrow molecular weight distribution linear low density ethylene hydrocarbon copolymers results in their processing at higher temperatures than equivalent melt index, long chain branched, free radical initiated low density polyethylene. Common processing temperatures for linear low density ethylene hydrocarbon copolymer film resins in blown film extrusion are approximately 204° C. or greater whereas free radical initiated, high pressure, low density polyethylene resins generally process at temperatures of approximately 177° C. Higher processing temperatures can cause thermal decomposition reactions in color concentrates/additives components/resin, resulting in evolved volatiles/gases.

In general, films extruded from polyethylene can be modified with various additive systems. They are generally formulated for blocking resistance and surface handling characteristics by the addition of antiblock agents (e.g. diatomaceous earth compounds). These additives also can contribute volatiles/gases to the extrusion system.

Pigment thermal stability is a primary factor in determining the lensing resistance of color concentrates used in film extrusion. Pigments suitable for coloring free radical initiated, high pressure low density polyethylene may not endure the thermal environment experienced in the film extrusion of narrow molecular weight distribution linear low density ethylene hydrocarbon copolymers. Color concentrate loading can have a dramatic effect on lens formation. Increased levels of a volatiles source will generally aggravate the problem of bubble formation in an extrudate, and, thus, increase lensing in fabricated film.

Volatiles/gases can arise from other sources. Residual/hydrocarbons in the resin, oligomeric species, catalyst residues and byproducts, etc. can also contribute to bubble formation in a melt.

A general approach to reduce bubble formation in an extruded melt is to reduce volatiles/gases fed to the extrusion system and minimize volatiles/gases generated in the extrusion process. Volatiles reduction, as a practicality, is difficult and/or undesirable. The ingredients commonly fed to an extruder processing polyethylene film can be potential sources of undesired volatiles/gases. Furthermore, as extrusion equipment becomes larger in size, bubble formation leading to film lensing is more prevalent, (e.g. 6 in. diameter extrusion equipment). Fabrication concepts to reduce volatiles include vented extrusion, utilization of a vacuum hopper, screw designs which develop early back pressure, etc. Some of these fabrication approaches are discussed in a paper by Domininghaus, H. "Problems in Processing Polyolefins Powders", SPE Antec Proceedings, pp 523–529, 1971.

It has now been found, unexpectedly, that resin formulation adjustments can raise the threshold levels of volatiles in the extrusion system before lensing occurs. As stated previously, film extruded from polyethylene can be modified with various pigment systems. They are also, generally, formulated for blocking resistance and surface handling characteristics by the addition of antiblock agents. Common antiblock agents include particulate, inorganic matter such as ground diatomaceous earth compounds (SUPER FLOSS), precipitated silicas (syloids), calcium carbonate, talc, etc. The presence of this particulate, inorganic matter, has been found to aggravate lensing. The presence of particulate inorganic antiblock agents causes discrete bubbles to form as the formulated melt decompresses on exiting the film die. Elimination of particulate, inorganic antiblocking agents from granular LLDPE film formations has been found to significantly reduce the occurrence of extrudate bubble formation which, in turn, leads to reduced lens formation in fabricated film. It has been further found that a specific agent provides films which are significantly reduced in the incidence of lens formation while maintaining all the advantages of the antiblock agent characteristics.

Thus according to copending U.S. patent application Ser. No. 462,432 filed on Jan. 31, 1983 and assigned to a common assignee, there is provided a method for reducing lensing in films fabricated from a granular linear narrow molecular weight distribution ethylene hydrocarbon copolymer containing inorganic or mixtures of inorganic and organic antiblock agents and other additives under conditions which would otherwise produce lensing in said films, which comprises, forming a film forming composition which includes a granular linear low density ethylene hydrocarbon copolymer resin and from about 0.05% to about 0.5% by weight of N,N'-ethylene-bis-stearamide, said stearamide replacing all or part of inorganic antiblock agent, extruding said film composition through a film die, and thereafter discharging said composition from said die to form a film of said extruded composition.

The present invention provides an improvement in part over the method disclosed in the copending application Ser. No. 462,432 by incorporating a specific type silica alumina ceramic microsphere filler, in designated amounts to the composition disclosed therein.

SUMMARY OF INVENTION

The present invention provides a method for reducing lensing in films fabricated from a granular linear narrow molecular weight distribution ethylene hydrocarbon copolymer containing inorganic or mixtures of inorganic and organic antiblock agents or additives, under conditions which would otherwise produce lensing in said films, which comprises, forming a film forming composition which includes a granular linear low density ethylene hydrocarbon copolymer resin, and from about 0.02–20% by weight of silica alumina ceramic microspheres having an average particle size of a range of mean diameters of 2–8 microns by volume and having a particle size distribution by volume such that about 90% pass 13 microns and no more than 8% pass 1 micron, and thereafter extruding said film composition through a film die, and thereafter discharging said composition from said die to form a film from said extruded composition.

In a preferred aspect the composition includes from about 0.05% to about 0.5% by weight of N,N'-ethylene-bis-stearamide.

The preferred concentration of the N,N'-ethylene-bis-stearamide is from about 0.1% to 0.3% by weight based on the weight of the composition and the preferred concentration of the microspheres is from about 0.05 to about 1%.

It has been found that the applicable microspheres are particularly suitable in their qualities and characteristics, in that they can eliminate or largely reduce the chance for lens formation if they are used as a substitute, in part or in total, for those inorganic powder antiblock substances such as silicas, silicates, carbonates, etc. commonly used in LLPDE films. Advantageously, lensing is reduced while still maintaining proper blocking and handling characteristics of the finished product.

DESCRIPTION OF THE PREFERRED EMBODIMENT

(1) The Linear Low Density Ethylene Hydrocarbon Copolymers

The low density ethylene hydrocarbon copolymers from which the films of the present invention are extruded, possess a molecular weight distribution, $M_w/M_n$, i.e., the ratio of the weight average molecular weight to the number average molecular weight, in the range of from about greater than or equal to 2.7, to less than or equal to 4.1 and preferably in the range of from about greater than or equal to 2.8, to less than or equal to 3.4. The copolymers have a melt flow ratio of from about greater than or equal to 22 to less than or equal to 32 and, preferably, from greater than or equal to 25, to less than or equal to 32. The melt flow ratio range of from greater than or equal to 22, to less than or equal to 32, thus corresponds to a $M_w/M_n$ value range of from about 2.7 to about 3.6, and the melt flow ratio range of from greater than or equal to 25, to less than or equal to 32, corresponds to a $M_w/M_n$ range of from about 2.8 to about 3.6. These ethylene hydrocarbon copolymers also have a total unsaturation content of from about greater than or equal to 0.1, to less than or equal to 0.3 $C=C$ per 1000 carbon atoms and, preferably, of from about greater than or equal to 0.14, to less than or equal to 0.24 $C=C$ per 1000 carbon atoms.

The low density ethylene hydrocarbon copolymers from which the films of the present invention are extruded are further characterized as copolymers of ethylene and at least one $C_3$ to $C_8$ alpha-olefin, and they may be produced in accordance with the procedures set forth in U.S. Pat. No. 4,302,566 in the names of F. J. Karol et al and entitled "Preparation of Ethylene Copolymers in Fluid Bed Reactor", as hereinafter described, and in accordance with the procedures set forth in U.S. Pat. No. 4,302,565 in the names of G. L. Goeke et al and entitled "Impregnated Polymerization Catalyst, Process For Preparing, and Use For Ethylene Copolymerization", as well as in accordance with the procedures which will produce ethylene hydrocarbon copolymers with the properties as heretofore described.

The copolymers are copolymers of a major mol percent (greater than or equal to 90) of ethylene and a minor mol percent (less than or equal to 10) of one or more $C_3$ to $C_8$ alpha-olefins.

The $C_3$ to $C_8$ alpha-olefins include propylene, butene-1, pentene-1, heptene-1, 4-methyl pentene-1, hexene-1 and octene-1.

The copolymers have a density of from about greater than or equal to 0.912, to less than or equal to 0.940, and preferably of from about greater than or equal to 0.916, to less than or equal to 0.935. They have a volatiles content (TEA, thermal evolution analysis) of from about 0.05 to 0.35 weight percent. Additionally, they have a standard melt index of from greater than or equal to 0.1, to less than or equal to 5.0, and preferably, of from about greater than or equal to 0.5, to less than or equal to 4.0.

The copolymers used in the present invention can be readily produced in a low pressure gas phase fluid bed reactor as disclosed in U.S. Pat. No. 4,243,619, by polymerizing the monomer charge under a specific set of operating conditions as disclosed therein, and in the presence of a specific high activity catalyst.

(2) N,N'-ethylene-bis-stearamide

The agent preferably incorporated in the film forming composition which can be substituted in whole or in part for the inorganic antiblocking agent according to the present invention is N,N'-ethylene-bis-stearamide. The compound is available from Glyco Chemicals, Inc. under the trademark "ACRAWAX C".

In general, the amount of N,N'-ethylene-bis-stearamide used in the composition can vary over a range of from about 0.05% to about 0.5% based on the weight of the composition. Best results are obtained by using an amount of N,N'-ethylene-bis-stearamide within the range of from about 0.1% to 0.3% based on the weight of the composition.

The N,N'-ethylene-bis-stearamide and the microspheres can be uniformly dispersed in the ethylene based extrusion composition. The dispersion can be effected by various dispersion techniques commonly employed by those skilled in the art of preparing extrudable compositions. The N,N'-ethylene-bis-stearamide and microspheres can be introduced into the ethylene polymer containing one or more other conventional additives, or along with the other additives, either by directly dry blending or by mixing with a Henschel type intensive mixer. The N,N'-ethylene-bis-stearamide, microspheres and one or more other additives can also be hot compounded directly into the ethylene based polymer or into a base polymer to make a masterbatch for the final letdown using conventional hot processing equipment such as a Banbury mixer, a Werner Pfleider twin screw mixing extruder or a single screw mixer extruder that has pelletization equipment on the head of the extruder.

The agents of choice i.e., N,N'-ethylene-bis-stearamide and microspheres can be admixed with other inorganic antiblocking agents well known in the art such as amorphous silica, diatomaceous earth, calcium carbonate, syloids, clays and talcs.

The amount of inorganic antiblocking agent which can be admixed with N,N'-ethylene-bis-stearamide should not exceed a certain concentration limit for the benefit in lens reduction to be significantly preserved. The limit would depend on the specific inorganic antiblock substance used and the severity of the lensing situation encountered. In general, however, an amount ranging from about 0 to about 0.25% can be admixed with the N,N'-ethylene-bis-stearamide.

Silica Alumina Ceramic Misrospheres

The silica alumina ceramic microspheres, known as "ZEEOSPHERES" ( a registered trademark, Zeeland Industries, Inc.) as supplied by one Company (Zeeland Industries) can be derived from fly ash as a source by certain separation techniques, for example (U.S. Pat. No. 4,115,256). The chemical nature of these silica alumina ceramic microspheres would typically be as follows:

$SiO_2$: 45–60%
$Al_2O_3$: 25–38%
$Fe_2O_3$: 2–6%

Other metal oxides can be present in small amounts such as CaO, MgO, NaO and $K_2O$.

Slight variations of the composition can exist from one fly ash source to the next. However those would not seriously interfere with the practice of the invention. The silica alumina ceramic microspheres filler should contain greater than 90% of the particles in a spherical shape and preferably greater than 99% of the particles spherical in shape. The average particle size of the filler shall have a range of mean diameter of 2–8 microns by volume by L&N microtrac and preferably 4–6 microns. The particle size distribution by volume by L&N microtrac shall be such that 90% pass 13 microns and no more than 8% pass 1 micron and preferably 90% passes 10 micron and less than 6% passes 1 micron. The specific gravity of such particles could range between 0.7 and approximately 2.5 gms/cc, but preferably ranges between 2.2 and 2.4. The strength of the spherically shaped particles should be such that they do not collapse during the film extrusion process. The filler loading in the film could range from 0.02% to 20% by weight based on the weight of the composition with the preferred range being about 0.05% to 1%.

Further information concerning these "ZEEOSPHERES" can be obtained from Zeeland Industries, Inc., St. Paul, MN 55101.

Extrudable Compositions

The extrudable compositions of the invention may be used in any of the forms of such compositions which are commonly employed in the extruded film arts, such as compounds modified with various slip agents for specific end use applications.

These extrudable compositions are thermoplastic in nature. In addition to the ethylene polymer, the N,N'-ethylene-bis-stearamide and the microspheres, the compositions of the present invention can contain other adjuvant materials which are commonly employed in ethylene polymer-based extrudable compositions. Such other adjuvants would include plasticizers, pigments, lubricants, slip agents, antioxidants, stabilizers, nucleating agents, modifiers and similar materials.

The plasticizers which may be employed in the ethylene polymer-based extrudable compositions of the present invention are the plasticizers which are commonly used with such polymers. The plasticizers are used in amounts which would correspond to from about 1 to about 25 percent by weight, based on the weight of ethylene polymers. Such plasticizers would include materials such as phthalates, phosphates, adipates, azelates, amine based polyols, and a number of other similar products.

The slip agents which are commonly employed in the ethylene polymer-based extrudable compositions are the lubricants which are commonly used with such polymers. The slip agents are used in amounts which correspond to from about 0.01 to about 0.2 percent by weight of lubricant agent based on the weight of the ethylene polymers. Examples of such slip agents are fatty acid amides such as oleamide and erucamide.

FILM EXTRUSION

I Blown Film Extrusion

The films formed as disclosed herein may be extruded by a tubular blown film extrusion process. In this process a narrow molecular weight distribution polymer is melt extruded through an extruder. This extruder may have an extrusion screw therein with a length to diameter ratio of about 15:1 to 21:1, as described in U.S. Pat. No. 4,343,755 in the names of John C. Miller, et al., and entitled "A Process For Extruding Ethylene Polymers". This Patent describes that this extrusion screw contains feed, transition and metering sections. Optionally, the extrusion screw can contain a mixing section such as that described in U.S. Pat. Nos. 3,486,192; 3,730,492 and 3,756,574, which are incorporated herein by reference. Preferably, the mixing section is placed at the screw tip.

The extruder which may be used herein may have a 12:1 to 32:1 length to internal diameter barrel ratio. The extrusion screw used in the present invention may have a length to diameter ratio of 12:1 to 32:1. When, for example, an extrusion screw of a length to diameter ratio of 18:1 is used in a 24:1 extruder, the remaining space in the extrusion barrel can be partially filled with various types of plugs, torpedoes, or static mixers to reduce residence time of the polymer melt.

The molten polymer is then extruded through a die, such as disclosed in U.S. Pat. Nos. 4,243,619; 4,267,146; 4,282,177, and 4,348,349.

The polymer is extruded at a temperature of about from 163° C. to about 260° C. The polymer is extruded in an upward vertical direction in the form of a tube although it can be extruded downward or even sideways. After extrusion of the molten polymer through the annular die, the tubular film is expanded to the desired extent, cooled, or allowed to cool and flattened. The tubular film is flattened by passing the film through a collapsing frame and a set of nip rolls. These nip rolls are driven, thereby providing means for withdrawing the tubular film away from the annular die.

A positive pressure of gas, for example, air or nitrogen, is maintained inside the tubular bubble. As is known in the operation of conventional film processes, the pressure of the gas is controlled to give the desired degree of expansion to the tubular film. The degree of expansion, as measured by the ratio of the fully expanded tube circumference to the circumference to die annulus, is in the range 1/1 to 6/1 and preferably, 1/1 to 4/1. The tubular extrudate is cooled by conventional techniques such as by air cooling, water quench or mandrel.

The drawdown characteristics of the polymers disclosed herein are excellent. Drawdown, defined as the ratio of the die gap to the product film gauge, is kept from greater than about 2 to less than about 250 and preferably from greater than about 25 to less than about 150. Very thin gauge can be produced at high drawdown from these polymers even when said polymer is highly contaminated with foreign particles and/or gel. Thin gauge films of about 0.5 to 3.0 mils can be processed to exhibit ultimate MD elongations greater than from about 400% to about 700%, and TD elongations greater than from about 500% to about 700%. Furthermore, these films are not perceived as "splitty". "Splittiness" is a qualitative term which describes the notched tear response of a film at high deformation rates. "Splittiness" reflects crack propagation rate. It is an end-use characteristic of certain types of film and is not well understood from a fundamentals perspective.

As the polymer exits the annular die, the extrudate cools, its temperature falls below its melting point, and it solidifies. The optical properties of the extrudate change as crystallization occurs and a frost line is formed. The position of this frost line above the annular die is a measure of the cooling rate of the film. This cooling rate has a very marked effect on the optical properties of the film produced herein.

The ethylene polymer can also be extruded in the shape of a rod or other solid cross section using the same die geometry for only the external surface. Additionally, the ethylene polymer can also be extruded into pipe through annular dies.

II. Slot Cast Extrusion

The films disclosed herein may also be produced by slot cast film extrusion. This film extrusion method is well known in the art and comprises extruding a sheet of molten polymer through a slot die and then quenching the extrudate using, for example, a chilled casting roll or water bath. In the chill roll process, film may be extruded horizontally and laid on top of the chill roll or it may be extruded downwardly and drawn under the chill roll. Extrudate cooling rates in the slot cast process are very high. Chill roll or water batch quenching is so fast that as the extrudate cools below its melting point, crystallites nucleate very rapidly, supramolecular structures have little time to grow and spherulites are held to a very small size. The optical properties of slot cast film are vastly improved over those characterizing films using the slow cooling rate, tubular blown film extrusion process. Compound temperatures in the slot cast film extrusion process generally run much higher than those typifying the tubular blown film process. Melt strength is not a process limitation in this film extrusion method. Both shear viscosity and extensional viscosity are lowered. Film can generally be extruded at higher output rate than practiced in the blown film process. The higher temperatures reduce shear stresses in the die and raise the output threshold for melt fracture.

III. Film

The film produced by the method of the present invention has a thickness of from greater than about 0.10 mils to about 20 mils, preferably from greater than about 0.10 to about 10 mils, about most preferably from greater than about 0.10 to about 4.0 mils.

PROPERTIES OF ETHYLENE POLYMERS, FILMS AND ARTICLES

The properties of the ethylene polymers, and the films and articles produced therefrom, were determined by the following methods:

Density: ASTM D-1505-Plaque is conditioned for one hour at 100° C. to approach equilibrium crystallinity reported as gms/cm$^3$.

Melt Index(MI): ASTM-1238—Condition E—measured at 190° C.—reported as grams per 10 minutes.

Flow Index(HLMI): ASTM D-1238—Condition F—measured at 10 times the weight used in the melt index test above—reported as grams per 10 minutes.

Melt Flow Ratio(MFR): Flow Index/Melt Index

Molecular Weight Distribution, Mw/Mn: Gel Permeation Chromatography styragel column packaging, pore size packing sequence is $10^7$, $10^5$, $10^4$, $10^3$, 60A; Solvent: Perchloroethylene at 177° C. Detection: Infrared at 3.4 m.

Lensing: The intensity of lensing was determined by cutting out three separate 1 ft square sections of the film and counting the number of lenses found in each section. The total number of lenses was then divided by three to determine the average number of lenses.

The Examples which follow further illustrate conditions for achieving the desired results.

EXAMPLE 1

Preparation of Polymer Resins

Linear low density ethylene-butene-1 copolymer resins were prepared according to the procedure disclosed in South African patent publication No. 79-01365, published Sept. 22, 1980, entitled "Process for Making Film from Low Density Ethylene Hydrocarbon Copolymers", by W. A. Fraser et al. The properties of the ethylene-butene-1 copolymer resin were determined by methods disclosed previously.

One of the ethylene-butene-1 copolymer resins has the following properties: a melt index of 1.0 grms/10 min., a MFR of 26, a density of 0.918 grms/cm$^3$, and a catalyst residue of Ti 2 ppm, Al 70 ppm, Si 60 ppm, and Cl 20 ppm.

EXAMPLES 2-6

A granular ethylene-butene-1 copolymer prepared as in Example 1, having a melt index of 1.0 grms/10 min and a resin density of 0.918 grms/cm$^3$, and containing approximately 200 ppm of "IRGANOX" (Ciba Geigy) 1076 octadecyl 3-(3',5'-di-tert-butyl-4'-hydroxyphenyl)-propionate or (octadecyl 3,5-di-tert-butyl-4-hydroxy-hydrocinnamate) as a storage stabilizer, was dry blended into a series of masterbatches containing either diatomaceous earth, or silica alumina microspheres ("ZEEOSPHERES" Grade 0/12), a slip agent (erucamide i.e., a fatty acid amide), N,N'-ethylene-bis-stearamide (ACRAWAX C) and pigments. The masterbatch was produced with a 2.0 MI, 0.918 density, ethylene-butene-1 copolymer as the masterbatch base resin. All masterbatches were produced using a Banbury mixer.

The pigment masterbatch included a mixture of yellow iron oxide, titanium oxide, and Phthalo Blue, was produced with a 2.0 MI, 0.918 density, ethylene-butene-1 copolymer. Dry blends of the 1 MI ethylene-butene-1 copolymer were made with various quantities of the above masterbatches. The tubular film extrusion equipment consisted of a 6 inch NRM 26:1 L/D extruder fitted with a standard 18:1 L/D mixing screw. The die was as described in U.S. Pat. No. 4,348,349 with a die gap of 50 mils. Films were produced at 47 RPM, 900 lbs/hr at 1.50 mil gauge at 2.7:1 BUR.

Table I illustrates, by Examples 2 to 6 that the removal of some or all particulate inorganic antiblock, i.e. diatomaceous earth (SUPER FLOSS), and the substitution of the microspheres results in the reduction of lenses in the final film. All percentages are by weight based on the weight of the composition.

materials had been shown to reduce lensing. Based on these results, the result with ZEEOSPHERES was unexpected. The silica-alumina microspheres have been found to be unique in their ability to reduce lensing by one decade while still providing the other characteristics as an antiblock. This behavior is believed a result of the spherical (minimum surface/volume ratio) nature of the microspheres and its smooth surface. It is believed that the performance of the ZEEOSPHERES depends not on its chemical nature but instead on its round, smooth shape and its highly stable inert inorganic nature.

The following Table II compares the lensing of other common inorganic antiblock substances from the literature as a decimal factor of that obtained with diatomaceous earth (SUPER FLOSS) of average particle size 5.5–6 microns.

TABLE I

| EXAMPLE NO. | SLIP AGENT (ERUCAMIDE) % BY WEIGHT | ANTIBLOCK AGENT TYPE | ANTIBLOCK AGENT % BY WEIGHT | PIGMENT % % BY WEIGHT | ACRAWAX C % BY WEIGHT | LENS COUNT NUMBER PER $FOOT^2$ |
|---|---|---|---|---|---|---|
| 2 | 0.1 | SUPER-FLOSS | 0.25 | 1.5 | 0.25 | 21 |
| 3 | 0.1 | Silica-Alumina Ceramic Microspheres (ZEEOSPHERES Grade 0/12) | 0.25 | 1.5 | 0.25 | 0 |
| 4 | 0.1 | SUPER FLOSS | 0.25 | 1.5 | 0.25 | 7.5 |
| 5 | 0.1 | ZEEOSPHERES Grade 0/12 | 0.25 | 1.5 | 0.25 | 0.2 |
| 6 | 0.1 | ZEEOSPHERES Grade 0/12 | 0.50 | 1.5 | 0.25 | 0.5 |

*The ZEEOSPHERES had an average particle size of 5.22. Ninety percent (90%) passed 9.6 microns and ten percent (10%) passed 1.57 microns. The chemical content was as follows:

$Al_2O_3$ 31%   $TiO_2$ 1.7%
$SiO_2$ 57%   CAO 0.8%
$Fe_2O_3$ 4%   MgO 1%
$K_2O$ 2.8% + other trace amounts of metal oxides

TABLE II

| EXAMPLE NO. | SLIP AGENT (ERUCAMIDE) % BY WEIGHT | ANTIBLOCK AGENT TYPE | ANTIBLOCK AGENT % BY WEIGHT | PIGMENT % % BY WEIGHT | ACRAWAX C % BY WEIGHT | DECIMAL[1] FACTOR |
|---|---|---|---|---|---|---|
| 7 | 0.1 | TALC (MISTRON RCS) | 0.25 | 1.5 | 0.25 | 1.0 |
| 8 | 0.1 | Amorphous Silica (Imsil A-25) | 0.25 | 1.5 | 0.25 | .97 |
| 9 | 0.1 | Amorphous Silica (Imsil A-15) | 0.25 | 1.5 | 0.25 | .50 |
| 10 | 0.1 | Calcium Carbonate (Microwhite 25) | 0.25 | 1.5 | 0.25 | .88 |
| 11 | 0.1 | Calcium Carbonate (Microwhite 50) | 0.25 | 1.5 | 0.25 | 1.08 |
| 12 | 0.1 | Percipitated silica (SYLOID 74 × 6000) | 0.25 | 1.5 | 0.25 | 6.0 |
| 13 | 0.1 | Precipitated Silica (SYLOID 244) | 0.25 | 1.5 | 0.25 | .75 |
| 14 | 0.1 | Preciptated Silica (SYLOID 169) | 0.25 | 1.5 | 0.25 | 3.0 |

[1]DECIMAL FACTOR IS A RATIO AS FOLLOWS:

$$\frac{\text{LENSING OF ALTERNATE ANTIBLOCK}}{\text{LENSING OF SUPERFLOSS}} = \text{DECIMAL FACTOR}$$

As can be seen from Table I that removal of diatomaceous earth (SUPER FLOSS) and the substitution of silica-alumina ceramic microspheres (ZEEOSPHERES Grade 0/12) reduces lensing by at least one decade. All percentages are by weight based on the weight of the composition. According to the prior art such substances as calcium carbonate, talc, magnesium carbonate and other siliceous (silicas) materials have been suggested as a substitute for antiblock. When these materials were tried as substitutions for SUPER FLOSS none of these Table III illustrating the following Examples 15 and 16 demonstrate the effectiveness of the ZEEOSPHERES without ACRAWAX C. The ethylene-butene copolymer used was as in Example 1 and each composition included slip agent 0.15%, antiblock agent 0.7% and pigment 1.5. The antiblock agent type was SUPERFLOSS in Example 15 and ZEEOSPHERES Grade 0/12 in Example 16. The results show a lens reduction of at least one decade in Example 16 as compared to Example 15.

TABLE III

| EXAMPLE NO. | SLIP AGENT (ERUCAMIDE) % BY WEIGHT | ANTI BLOCK AGENT TYPE | ANTIBLOCK AGENT % BY WEIGHT | ACRAWAX C % BY WEIGHT | LENS COUNT PER FT$^2$ |
|---|---|---|---|---|---|
| 15 | 0.15 | SUPERFLOSS | 0.7 | 0.0 | 72 |
| 16 | 0.15 | ZEEOSPHERES GRADE 0/12 | 0.7 | 0.0 | 7 |

What is claimed is:

1. A method for reducing lensing in films fabricated from a granular linear narrow molecular weight distribution ethylene hydrocarbon copolymer containing inorganic or mixtures of inorganic and organic antiblock agents and other additives under conditions which would otherwise produce lensing in said films, which comprises, forming a film forming composition which includes a granular linear low density ethylene hydrocarbon copolymer resin, and from about 0.02–20% silica alumina ceramic microspheres having an average particle size of a range of mean diameters of 2–8 microns by volume and having a particle size distribution by volume such that about 90% pass 13 microns and no more than 8% pass 1 micron, extruding said film composition through a film die, and thereafter discharging said composition from said die to form a film of said extruded composition.

2. A method according to claim 1 wherein said film forming composition contains said microspheres in an amount from about 0.05 to about 1% by weight based on the weight of the composition.

3. A method according to claim 1 wherein said composition includes from about 0.05% to about 0.5% by weight of N,N'-ethylene-bis-stearamide.

4. A method according to claim 1 wherein said hydrocarbon copolymer has a melt index of from greater than or equal to about 0.1, to less than or equal to about 5.0.

5. A method according to claim 1 wherein said hydrocarbon copolymer has a melt index of from greater than or equal to about 0.5, to less than or equal to about 4.0.

6. A method according to claim 1 wherein said copolymer has a density from greater than or equal to about 0.912, to less than or equal to about 0.940.

7. A method according to claim 6 wherein said copolymer has a molecular weight distribution of from greater than or equal to about 2.7 to less than or equal to about 3.6.

8. A method according to claim 1 wherein said copolymer is a copolymer of ethylene with one or more $C_3$ to $C_8$ alpha-olefins.

9. A method according to claim 8 wherein said alpha-olefins are propylene, butene-1, hexene-1 and octene-1 and mixtures thereof.

10. A method according to claim 3 wherein said hydrocarbon copolymer has a melt index of from greater than or equal to about 0.1, to less than or equal to about 5.0.

11. A method according to claim 3 wherein said hydrocarbon copolymer has a melt index of from greater than or equal to about 0.5, to less than or equal to about 4.0.

12. A method according to claim 3 wherein said copolymer has a density from greater than or equal to about 0.912, to less than or equal to about 0.940.

13. A method according to claim 12 wherein said copolymer has a molecular weight distribution of from greater than or equal to about 2.7 to less than or equal to about 3.6.

14. A method according to claim 3 wherein said copolymer is a copolymer of ethylene with one or more $C_3$ to $C_8$ alpha-olefins.

15. A method according to claim 14 wherein said alpha-olefins are propylene, butene-1, hexene-1 and octene-1 and mixtures thereof.

* * * * *